May 4, 1954

B. GRINSTED 2,677,236

GAS TURBINE POWER PLANT AND METHOD
UTILIZING SOLID WATER-BEARING FUEL

Filed Sept. 10, 1951

Inventor
Brian Grinsted
By
Stevens, Davis, Miller & Mosher
His Attorneys

Patented May 4, 1954

2,677,236

UNITED STATES PATENT OFFICE 2,677,236

GAS TURBINE POWER PLANT AND METHOD UTILIZING SOLID WATER-BEARING FUEL

Brian Grinsted, Claygate, England, assignor to Power Jets (Research and Development) Limited, London, England, a British company Application September 10, 1951, Serial No. 245,877

Claims priority, application Great Britain September 14, 1950

7 Claims. (Cl. 60—39.46)

This invention relates to gas turbine power plants utilising solid water-bearing fuel, and is an improvement or modification of the constructions described in copending United States patent applications Serial No. 103,993, filed July 11, 1949 and Serial No. 245,946, filed September 10, 1951, in the name of Campbell H. Secord, and Serial No. 245,941, filed September 10, 1951, in the name of Reginald G. Voysey.

By the term "water-bearing fuel" herein is meant a fuel containing or being otherwise combined with a substantial quantity of water which might amount to as much as ten times its own weight. Such a fuel may for example be bagasse, sewage sludge, coal slurry, sulphite pulp mill waste, town refuse or peat.

As more fully explained in said first-mentioned copending application, this type of gas turbine combines the idea of injecting water into the working fluid system with the use of a fuel having a water content such as to render its use normally uneconomic. The use of water injection has the result that, for a designed temperature at the turbine, the quantity of cooling air above that required for complete combustion may be reduced and the size of the plant correspondingly decreased. Such water injection normally requires a large external supply of water but this is obviated in the present case by utilising the water content of a water-bearing fuel which might otherwise be useless. This introduction of water will be particularly advantageous if the quantity of water supplied to the working fluid system reaches a maximum amount consistent with a designed temperature at the turbine and a substantially stoichiometric air-fuel ratio in the combustion chamber. Water injection under these circumstances will be referred to as "maximum water injection."

Accordingly the invention provides a gas turbine power plant utilising solid water bearing fuel comprising a source of hot compressed air, a fuel drier receiving said fuel and part of said air supply from the source and in which at least part of the water content of the fuel is evaporated, a combustion chamber receiving the remainder of the air supply direct from the source and the solid content of the fuel from the drier, and a turbine receiving the combustion gases from the combustion chamber and the whole of the water content of the fuel.

Preferably a part of the combustion gases from the combustion chamber are recirculated to the drier to assist in drying fuel, as described in said first mentioned copending application.

Two specific embodiments of the invention will now be described by way of example with reference to the accompanying drawings of which—

Figure 1:
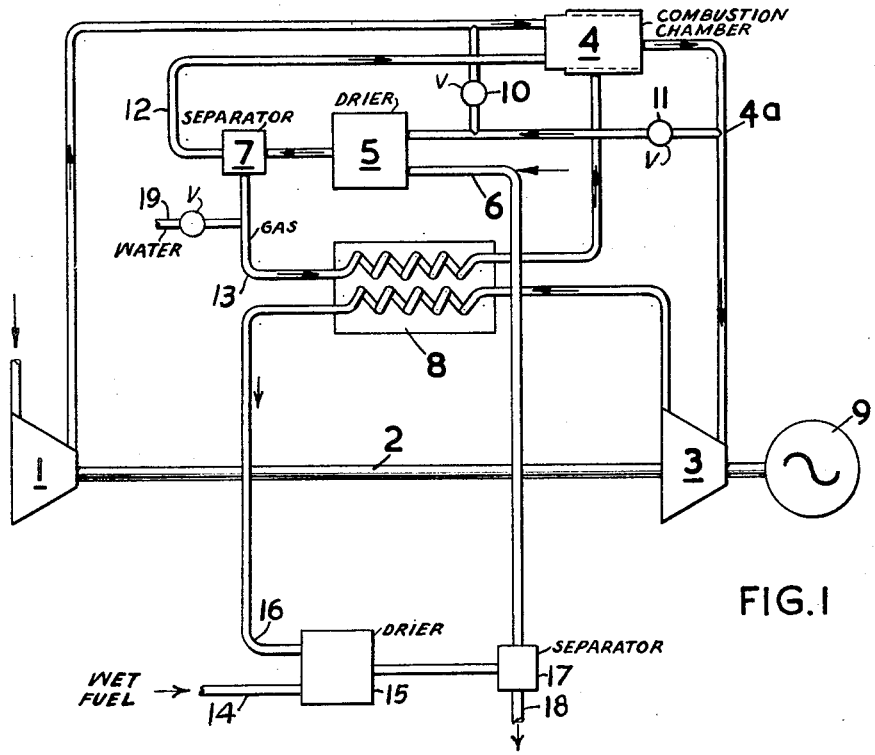
Fig. 1 is a diagrammatic layout of a gas turbine power plant for driving an alternator.

Referring to Fig. 1, the plant comprises a compressor 1 connected by a shaft 2 to a turbine 3 which drives it. The compressor 1 delivers air to a combustion chamber 4 and also through a valve 10 to a fuel drier 5. The flow of combustion gases from the combustion chamber 4 is divided at 4a and part is recirculated through valve 11 to the drier 5 and part passed to the turbine 3. Water-bearing fuel is supplied to drier 5 through inlet 6, and is mixed therein with the hot compressed air from the compressor and the recirculated combustion gases, which together serve to evaporate some or all of the water content of the fuel. The mixture of the solid fuel, and the gaseous constituents consisting of air, steam, and recirculated gases is then passed to separator 7. Here the solid fuel is separated out and delivered together with a small part of the gaseous constituents through duct 12 directly to the combustion chamber 4 where it is burnt in the air supplied directly by the compressor 1, the combustion gases being discharged as previously mentioned. The greater part of the gaseous constituents are led through duct 13 to one side (hereinafter referred to as the cold side) of a heat exchanger 8 where they are heated by means of the exhaust gases from the turbine 3. The said gaseous constituents pass from the heat exchanger 8 into the combustion chamber 4 downstream of the primary combustion zone to cool the walls thereof in known manner (as shown purely diagrammatically in the drawings) and are then mixed with the combustion gases to reduce their temperature to the designed maximum temperature at the turbine inlet. These combustion gases drive the turbine 3 which in turn drives an alternator 9, and the gases then pass through the hot side of heat exchanger 8 to heat the air, steam and recirculated gases as described above.

The quantity of air supplied direct to the combustion chamber 4 is at least that required for a stoichiometric air-fuel ratio, but the quantity supplied to the drier will vary with the water content of the fuel.

For low water contents, only a small quantity of recirculated gases is required for evaporation of the water, but a large amount of excess air is required to bring the turbine inlet temperature down to its maximum permissible value. By passing this excess air through the drier and heat exchanger (instead of directly to the combustion chamber) the mass flow through the heat exchanger 8 is increased so as to obtain the greatest advantage from heat exchange. When operating under these conditions, the plant is similar to that described in said copending application Serial No. 245,941.

For fuels of high moisture content, the flow of recirculated gases must be increased so as to evaporate the water, but the excess air can be reduced since the evaporated water will effect the necessary cooling at the turbine, and less air will be required to supplement the mass flow in the heat exchanger. Hence less air will be supplied to the drier and with fuels of high water content, approaching that corresponding to maximum water injection, the air supply to the drier will be almost entirely cut off. In these conditions, the plant will be operating in the same manner as said copending application Serial No. 245,946.

Thus it will be seen that the plant according to the present invention is intended to deal with fuels of water content lying between that of the fuels used in said copending applications Serial Nos. 245,941 and 245,946. By adjusting the relative quantities of air and recirculated gases by means of valves 10 and 11 any fuel within this range can be satisfactorily utilised. The quantities are further related to the water content of the fuel so as to give a temperature at the entry to the cold side of the heat exchanger corresponding to the dewpoint, that is, the gaseous constituents at this point are saturated. This will give the greatest possible temperature difference between the hot and cold sides of the heat exhanger 8.

Figure 2:
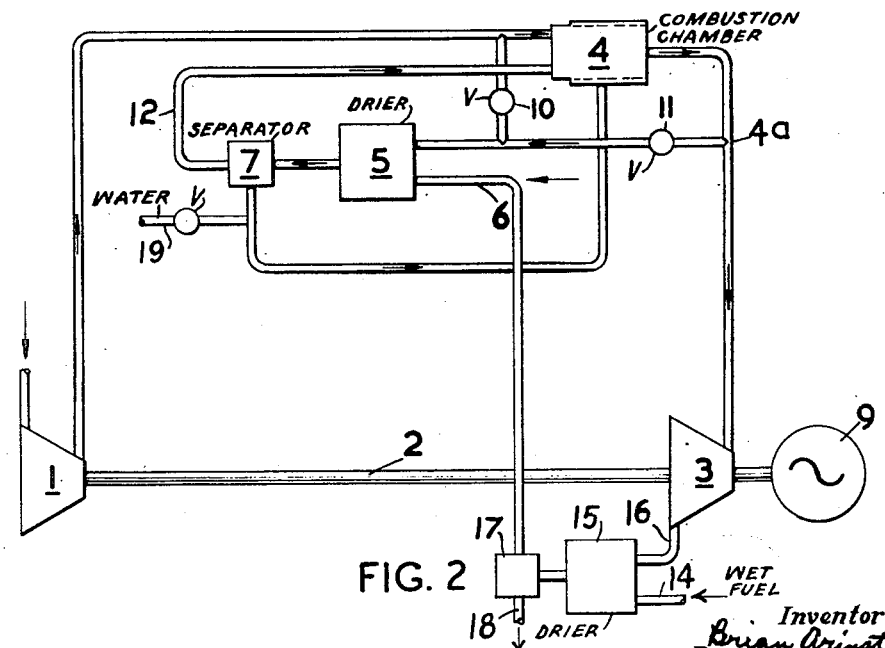
Fig. 2 is a modification of the arrangement shown in Fig. 1.

A similar plant to that of Fig. 1 is shown in Fig. 2. The same reference numerals are used therein, and the only difference is the omission of the heat exchanger 8.

In either case, if desired, the incoming fuel to the drier can be pre-heated and partially dried by means of the exhaust gases after they leave the heat exchanger 8 for example, in the manner described in said co-pending application No. 103,993. The raw fuel is led through inlet 4 into a drier 15 which has a further inlet 16 connected to receive the exhaust gases from the hot side of the heat exchanger 8, and an outlet connected to a separator 17. The hot gases evaporate part of the water content of the fuel in drier 15, and the resultant steam, the hot gases and the solid fuel are all led to the separator 17. Here the gaseous and solid constituents are separated, the partly dried and preheated solid fuel with its remaining water content being supplied to inlet 6 of the drier 5, and the steam and exhaust gases being discharged at 18. This would make it possible to use raw fuel having a greater moisture content than would otherwise be the case. Alternatively or in addition, the exhaust gases can be used to preheat the compressed air from compressor 1 by heat exchange.

Ideally the various components of the plant will be designed for a particular set of conditions of air flow, fuel supply and moisture content of the fuel. In practice it may be necessary to introduce further controls, for instance, additional water might be introduced into the system through inlet 19 between the outlet of separator 7 and the inlet to the cold side of the heat exchanger 8 to reduce the temperature of gases passing through the turbine to the designed value and at the same time to supplement the mass flow of gases through the cold side of the heat exchanger 8 if the moisture present temporarily becomes insufficient.

In the ideal case there will be no moisture in the primary combustion zone of the combustion chamber but in practice up to about 30 per cent moisture content will be permissible without affecting the efficiency to any substantial extent. Thus when using a fuel of fairly low moisture content, the gases from the cold side of the heat exchanger may be led into the primary combustion zone of the combustion chamber together with the fuel.

I claim:

1. A gas turbine power plant for utilizing solid water-bearing fuel comprising a source of hot compressed air; a drier for evaporating at least part of the water content of said fuel having an inlet for said fuel and an outlet; a separator for separating at least part of said evaporated water content from the solid content of the fuel, having an inlet connected to the outlet of the drier, a first outlet for said solid content and a second outlet for said evaporated water content; a combustion chamber having an inlet connected to the first outlet of the separator and an outlet for combustion gases; a turbine having an inlet connected to the combustion chamber outlet, and an outlet for exhaust gases; a connection between said source and the drier affording a path for part of the hot compressed air to effect at least partly the evaporation of the water content; a connection between said source and the combustion chamber affording a path for the remainder of said compressed air to support combustion of the solid content of the fuel; and a connection between the second outlet of the separator and the turbine inlet.

2. Plant according to claim 1 comprising an air compressor constituting said source of hot compressed air.

3. A gas turbine power plant for utilizing solid water-bearing fuel comprising a source of hot compressed air; a drier for evaporating at least part of the water content of said fuel having an inlet for said fuel and an outlet; a separator for separating at least part of said evaporated water content from the solid content of the fuel, having an inlet connected to the outlet of the drier, a first outlet for said solid content and a second outlet for said evaporated water content; a combustion chamber having an inlet connected to the first outlet of the separator and an outlet for combustion gases; a turbine having an inlet connected to the combustion chamber outlet, and an outlet for exhaust gases; connections between said source and the drier and between the combustion chamber outlet and the drier affording paths for part of the compressed air and for part of the hot combustion gases respectively to effect the evaporation of the water content; a connection between said source and the combustion chamber affording a path for the remainder of said compressed air to support combustion of the solid content of the fuel; and a connection between the second outlet of the separator and the turbine inlet.

4. Plant according to claim 3 further comprising means for varying the flows of air and combustion gases in said connections from the source and the combustion chamber to the drier.

5. A gas turbine power plant for utilizing solid water-bearing fuel comprising a source of hot compressed air; a drier for evaporating at least part of the water content of said fuel having an inlet for said fuel and an outlet; a separator for separating at least part of said evaporated water content from the solid content of the fuel, having an inlet connected to the outlet of the drier, a first outlet for said solid content and a second outlet for said evaporated water content; a combustion chamber including a primary combustion zone and secondary and mixing zones downstream thereof, and having a first inlet to said primary zone connected to the first outlet of the separator, a second inlet to a zone downstream of the primary zone connected to the second outlet of the separator, and an outlet for combustion gases; a turbine having an inlet connected to the combustion chamber outlet and an outlet for exhaust gases; connections between said source and the drier and between the combustion chamber outlet and the drier affording paths for part of the compressed air and for part of the hot combustion gases respectively to effect the evaporation of the water contents; and a connection between said source and the combustion chamber affording a path for the remainder of said compressed air to support combustion of the solid content of the fuel.

6. A gas turbine power plant for utilizing solid water-bearing fuel comprising a source of hot compressed air; a drier for evaporating at least part of the water content of said fuel, having an inlet for said fuel and an outlet; a separator for separating at least part of said evaporated water content from the solid content of the fuel, having an inlet connected to the outlet of the drier, a first outlet for said solid content and a second outlet for said evaporated water content; a combustion chamber having an inlet connected to the first outlet of the separator and an outlet for combustion gases; a turbine having an inlet connected to the combustion chamber outlet and an outlet for exhaust gases; a heat exchanger of which the hot side has an inlet connected to the turbine outlet, and an exhaust outlet, and the cold side has an inlet connected to the second outlet of the separator, and an outlet; connections between said source and the drier and between the combustion chamber outlet and the drier affording paths for part of the compressed air and for part of the hot combustion gases respectively to effect the evaporation of the water content; a connection between said source and the combustion chamber affording a path for the remainder of said compressed air to support combustion of the solid content of the fuel; and a connection between the outlet of the cold side of the heat exchanger and the turbine inlet.

7. A method of operating a gas turbine plant including a source of hot compressed air, a combustion chamber, a turbine connected to receive combustion gases from the combustion chamber, and a heat exchanger connected to receive exhaust gases from the turbine, comprising the steps of supplying to the plant a solid water-bearing fuel, leading into contact therewith part of the hot compressed air from said source and part of the hot combustion gases from the combustion chamber and thereby evaporating at least part of the water content of the fuel, at least partly separating the solid and gaseous constituents, supplying the solid constituents and the remainder of the hot compressed air from said source to said combustion chamber and burning the fuel therein in said air, supplying the gaseous constituents firstly to the heat exchanger to be heated therein by the exhaust gases and then to the turbine, wherein the quantities of hot compressed air and combustion gases led into contact with the fuel are such that the temperature of said gaseous constituents entering the heat exchanger corresponds to the dewpoint thereof.

References Cited in the file of this patent

UNITED STATES PATENTS

| Number | Name | Date |
|---|---|---|
| 1,197,456 | Dinsmore | Sept. 5, 1916 |
| 1,809,819 | Caller | June 16, 1931 |
| 2,032,402 | Colby et al. | Mar. 3, 1936 |
| 2,066,418 | O'Mara | Jan. 5, 1937 |
| 2,148,447 | Dundas et al. | Feb. 28, 1939 |
| 2,171,535 | Berg et al. | Sept. 5, 1939 |

FOREIGN PATENTS

| Number | Country | Date |
|---|---|---|
| 18,329 | Great Britain | Aug. 24, 1904 |
| 166,517 | Great Britain | Sept. 7, 1922 |

OTHER REFERENCES

"Engineering," volume 169, No. 4400, May 26, 1950, page 608.